UNITED STATES PATENT OFFICE.

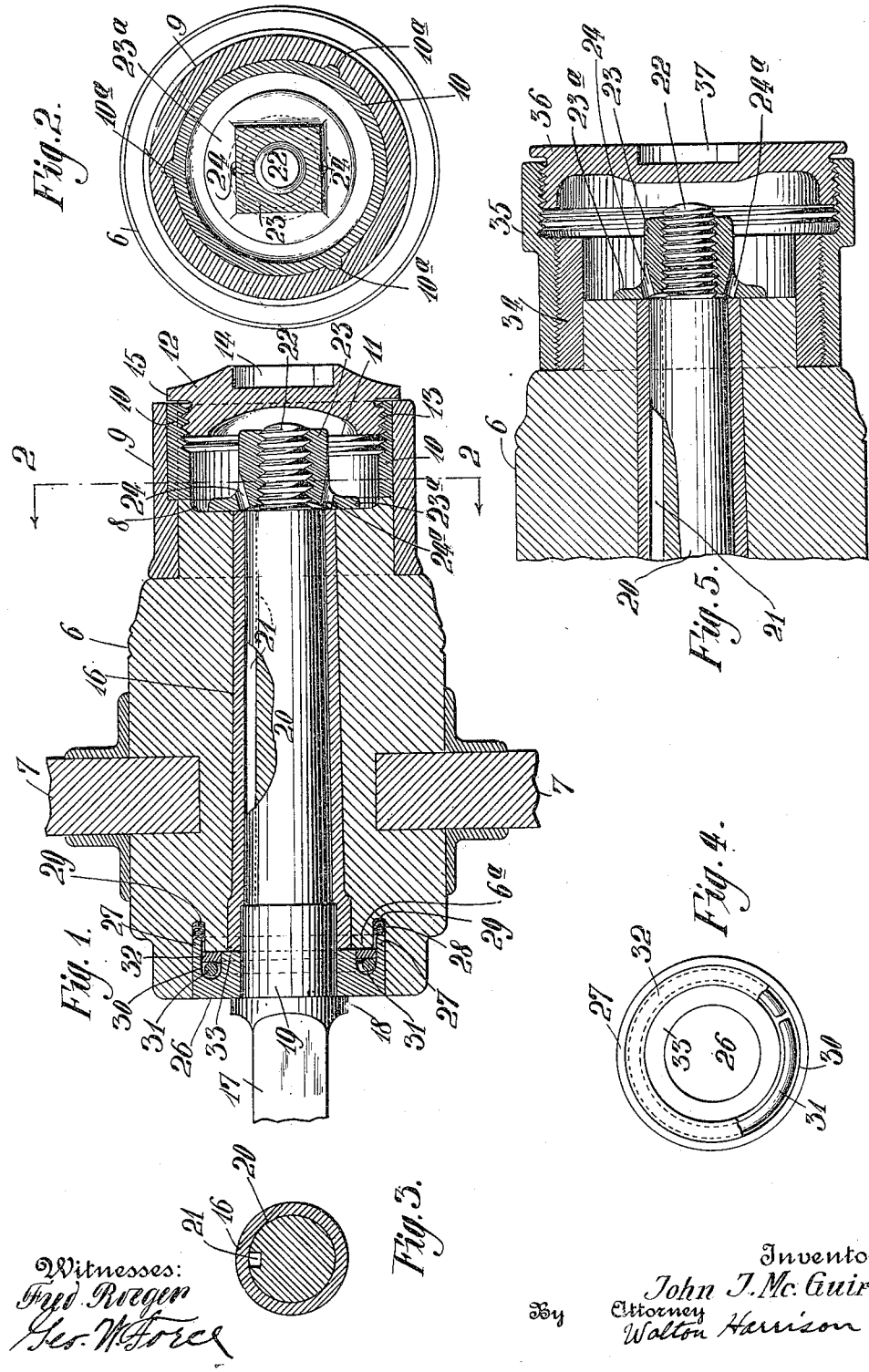

JOHN J. McGUIRE, OF NEW YORK, N. Y.

DUST-PROOF GUARD FOR AUTOMATIC AXLE-OILERS.

1,142,260.  Specification of Letters Patent.  Patented June 8, 1915.

Application filed July 25, 1914. Serial No. 853,042.

*To all whom it may concern:*

Be it known that I, JOHN J. McGUIRE, a citizen of the United States, residing at New York city, borough of Manhattan, county and State of New York, have invented certain new and useful Improvements in Dust-Proof Guards for Automatic Axle-Oilers, of which the following is a specification.

My invention relates to oilers for axles, my more particular purpose being to provide a so-called automatic oiler which is dust proof and comprises a number of advantages.

More particularly stated my improved device is of special use in connection with vehicle wheels, the purpose being to enable the lubricating mechanism of the hub and parts adjacent thereto to be operated continuously for long periods of time without requiring the attention of the operator.

Reference is made to the accompanying drawing forming a part of this specification, and in which like letters indicate like parts.

Figure 1 is a central section through a hub and parts associated therewith used in connection with my improved oiler. Fig. 2 is a vertical section on the line 2—2 of Fig. 1 looking in the direction of the arrows. Fig. 3 is a cross section through the spindle and hub box. Fig. 4 is a detail showing partly in elevation and partly broken away, a collar forming a part of my device. Fig. 5 is a fragmentary section showing the grease receptacle different in form than the one shown at the right of Fig. 1.

The hub appears at 6, the spokes at 7, and a cavity in the outer end of the hub is shown at 8. The hub is provided with a bearing surface 6ª, of annular form, sunken into the inner end thereof—that is, into the end which is to be nearest the wagon. Encircling the outer end of the hub is a hub collar 9 made of metal. In this instance the hub collar is provided with a bushing 10, also of metal preferably pressed or otherwise rigidly secured to it. If desired, however, the parts 9—10 may be made in a single piece, which I designate as a whole as the hub collar. The bushing 10 is provided with anchorages 10ª as shown in Fig. 2.

The hub collar is provided internally with a thread 11. A closure cap is shown at 12 and is provided with a thread 13 mating the thread of the hub collar. The closure 12 is further provided with a wrench hole 14 of angular conformity to facilitate the application of a wrench in order to turn the closure cap. A shoulder 15 is provided for the closure cap, and is adapted to lodge against the adjacent portion of the hub collar. The hub 6 carries a tapered box 16, which may be of the usual or any preferred shape. The axle is shown at 17 and is provided with an annular shoulder 19 and with a substantially cylindrical portion 19, this portion and a tapered portion 20 together forming a spindle. The spindle is provided with a longitudinally disposed groove 21 and with a threaded reduced portion 22. A nut 23 is threaded internally and fitted upon this portion 22, the nut being further provided with an annular shoulder 23ª which is adapted to lodge against the adjacent portion of the hub—that is against the bottom of the cavity 8. The nut 23 is provided with a pair of oil holes 24, 24ª. The hole 24 is in registry with the groove 21 so as to readily supply grease thereinto, and the hole 24ª is so located as to readily supply grease in between the inner surface of the box 16 and the outer surface of the spindle. A collar 26 of metal is shrunken or otherwise rigidly secured upon the portion 19 of the axle. This collar is provided with an annular flange 27 which engages an absorbent packing 28, which is mounted within an annular groove 29 carried by the hub, and has the form of a wick or of an endless cord. The collar 26 is further provided with a groove 30, and located within this groove is a spiral spring 31 formed of a single turn of stout spring wire, as indicated in Fig. 4. This spring when unconfined has a spiral form, but when in position is practically a ring. An annular packing 32, which may be made of leather or other flexible material suitable for the purpose, is located within the groove 30 and is concentric to the annular flange 27. The collar 26 is provided with an annular shoulder 33, which abuts against the adjacent end portion of the box 16. In some instances, as indicated in Fig. 5, the hub collar has the form shown at 34 and detachably fitted upon it is a collet 35. The outer end of this collet has an enlarged diameter and is threaded internally and fitted with a closure member 36, the latter having generally the form of a cap, and being provided with an angular hole 37 to facilitate the application of a wrench in order to turn the closure member.

Whether the closure member have the form shown at 12 in Fig. 1, or at 36 in Fig. 5 it coöperates with the adjacent portion of the hub collar and the adjacent end portion of the hub, in such manner as to constitute a compartment for holding grease.

When the parts are assembled as indicated and the space surrounding the nut 23 is filled with grease and closed by the application of the closure cap, as above described, the movement of the closure cap forces the grease through the oil hole 24 and into the groove 21; also through the hole 24$^a$ and thence in between the outer surface of the spindle and the inner surface of the box 16. Then as the hub is subjected to ordinary use the grease is carried from the groove 21 and around the spindle 20 and thus does its work of lubricating. The grease can not escape at the inner end of the hub, as it is unable to pass the packings 32 and 28. The packing 32, held by the spring 31 against the adjacent portion 6$^a$ of the hub, forms a very efficient grease tight joint. If through any chance a little of the grease should escape past the packing 32, it is unable to pass through the packing 28 or around this packing or between this packing and the flange 27.

It will be noted that the annular shoulder 33 is a bearing surface, and that it directly engages the adjacent annular bearing surface of the hub.

I find that in practice, during the normal use of the device, the grease is gradually worked inward—that is it tends to travel to the left according to Fig. 1. I also find that while oils more or less thick may be employed as lubricants, it is preferable to use a tolerably heavy grease where the device is employed in connection with heavy vehicles.

I do not limit myself to the precise construction shown as variations may be made therefrom without departing from the spirit of my invention.

I claim:

1. A device of the character described comprising a revoluble hub provided with an end portion and with an annular bearing surface, a fixed spindle extending into said hub, a collar mounted upon said spindle and extending into engagement with said annular bearing surface, said collar being provided with a groove, a packing located within said groove and engaging said annular bearing surface of said hub, and a spring carried by said collar and engaging said packing in order to press the latter against said annular bearing surface of said hub.

2. A device of the character described, comprising a fixed spindle, a collar mounted thereupon and provided with an annular flange and with an annular groove, said collar being further provided with an annular bearing surface disposed adjacent said groove, a spring of general annular form located within said groove, a packing of annular form disposed within said groove and engaging said spring, a hub revolubly mounted upon said spindle and provided with a bearing surface for engaging said annular bearing surface of said collar, said hub being further provided with a groove into which extends said annular flange with which said collar is provided, and a packing disposed within said last mentioned groove and engaged by said flange.

In testimony whereof I have signed my name to this specification in the presence of two subscribing witnesses.

JOHN J. McGUIRE.

Witnesses:
L. ALTMAN,
WALTON HARRISON.